Figure 1:
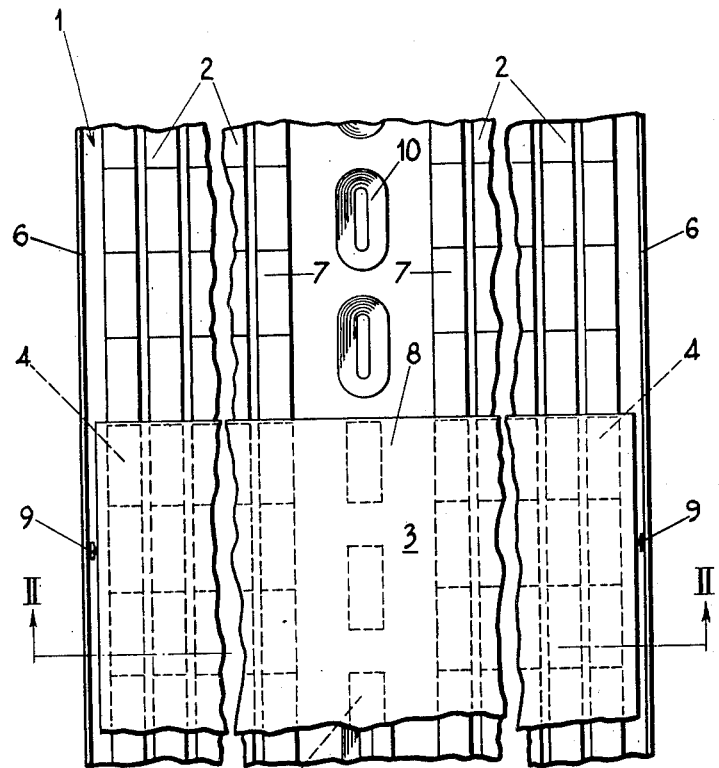

Nov. 24, 1964 G. R. POLGREEN 3,158,765
MAGNETIC SYSTEM OF TRANSPORTATION
Filed Aug. 25, 1959 3 Sheets-Sheet 1

INVENTOR
GEOFFREY RICHARD POLGREEN
BY
ATTORNEYS

Nov. 24, 1964    G. R. POLGREEN    3,158,765
MAGNETIC SYSTEM OF TRANSPORTATION
Filed Aug. 25, 1959    3 Sheets-Sheet 2

INVENTOR
GEOFFREY RICHARD POLGREEN
ATTORNEYS

Nov. 24, 1964  G. R. POLGREEN  3,158,765
MAGNETIC SYSTEM OF TRANSPORTATION
Filed Aug. 25, 1959  3 Sheets-Sheet 3

INVENTOR
GEOFFREY RICHARD POLGREEN
BY Ansdutens, Ansdutens & Olfes
ATTORNEYS

United States Patent Office 3,158,765
Patented Nov. 24, 1964

3,158,765
MAGNETIC SYSTEM OF TRANSPORTATION
Geoffrey Richard Polgreen, Wendover, England, assignor to The General Electric Company Limited, London, England
Filed Aug. 25, 1959, Ser. No. 835,987
Claims priority, application Great Britain, Aug. 27, 1958, 27,516/58; Dec. 12, 1958, 40,162/58; Apr. 17, 1959, 13,179/59
12 Claims. (Cl. 310—12)

This invention relates to systems of transportation.

Most known and proposed systems of transportation suffer from a number of well known disadvantages. The efficient working of railways, for example, is considerably hampered by the forces of friction acting upon the locomotives and rolling stock. Also, in the case of passenger-carrying railway vehicles in particular, the ratio of the useful weight carried to the total weight of the vehicles is very low. These factors make it necessary for the source of motive power used for propulsion to be capable of a power output which is disproportionately high when considered in relation to the useful work done. Very similar disadvantages arise in the case of road vehicles.

In the case of aircraft the ratio of the useful weight carried to the total weight of the aircraft is similar to that for railways. Frictional forces of the kind mentioned above are, however, eliminated when the aircraft is in the air, with a consequent saving in the power required for forward propulsion. Against this reduction in the power required for overcoming frictional forces must be set the fact that a large continuous output of power is necessary to maintain the aircraft in the air and any failure of the source supplying this power, unless only momentary, may easily have disastrous consequences.

A land vehicle which attempts to make use of some of the advantages of an aircraft is a wheelless car which has recently been proposed, the car being maintained out of contact with the ground by means of downwardly directed jets of compressed air. As with aircraft, the power necessary to propel the car forward is quite small, at least for low speeds, but the car still has the disadvantage that a continuous output of power (of the order of 50 horsepower per ton weight of the car) is necessary to maintain the car out of contact with the ground. Such a car also has the disadvantage that a failure of the source of power could easily have disastrous consequences, particularly if it were to occur when the car was moving forward at speed.

Another craft which has recently been demonstrated uses a similar principle to that of the wheelless car, the air being provided, in this case, by fans. Although this craft has the advantage of being able to traverse land or water it also has the two disadvantages particularly mentioned in the last paragraph.

One object of the present invention, therefore, is to provide a system of transportation in which some at least of the disadvantages mentioned above are substantially overcome.

Hereafter in this specification the word "vehicle" should be taken to mean an arrangement, used in a system of transportation, in or on which persons or things may be conveyed from place to place and the interpretation to be placed on the word includes the case wher the arrangement does not run on wheels.

According to the present invention, in a system of transportation including at least one vehicle arranged to co-operate with a trackway, means being provided to propel the vehicle from place to place along the trackway, permanent magnets are provided in the trackway and on the vehicle, the mutual repulsion between the permanent magnets on the vehicle and adjacent permanent magnets in the trackway being such that the load-bearing contact between the vehicle and the trackway is substantially reduced.

The trackway may include a substantially continuous, longitudinally-extending part which is raised with respect to the remainder of the trackway, the vehicle being provided with guidance means which are arranged to co-operate with said part. Alternatively, the vehicle may be suspended below the trackway by means of a support structure which forms part of the vehicle and which co-operates with the trackway to support the vehicle, said magnets on the vehicle being provided on the supporting structure. As a further alternative, a longitudinally-extending series of vehicles may be provided, each vehicle being flexibly coupled at its ends to the adjacent vehicles on either side, the series of vehicles together having a substantially continuous upper surface whereby the system may be used as a conveyor.

Said magnets in the trackway may be arranged in rows which extend longitudinally of the trackway, all the magnets in any given row in the trackway having poles of the same polarity uppermost and, apart from the two rows of magnets in the trackway which are nearest the centre of the trackway, all the magnets in any given row in the trackway being of opposite polarity to the magnets in the immediately adjacent rows, and said magnets on the vehicle may be arranged in rows similar in number and disposition to the rows in the trackway, all the magnets in any given row on the vehicle having poles of the same polarity downwards, this polarity being the same as that of the magnets in the immediately adjacent row of magnets in the trackway.

Preferably said means to propel the vehicle comprises a row of coils disposed longitudinally of either the vehicle or the trackway, a row of permanent magnets (traction magnets) disposed longitudinally of either the trackway or the vehicle respectively, the row of coils and the row of traction magnets being adjacent one another and the row of traction magnets being arranged to have poles of alternate polarity adjacent the coils, and means arranged to energise the coils with an alternating current so as to generate magnetic fields which give rise, in effect, to magnetic poles adjacent the traction magnets so that the magnetic fields associated with the coils co-operate by attraction and repulsion wih the magnetic fields associated with the traction magnets in such a way that the vehicle is propelled along the trackway.

Said magnets and said traction magnets may be formed of barium ferrite and the arrangement may be such that there is no load-bearing contact between the vehicle and the trackway.

Figure 2:
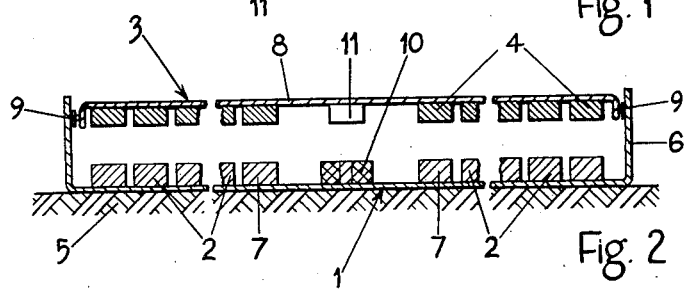
Figure 3:
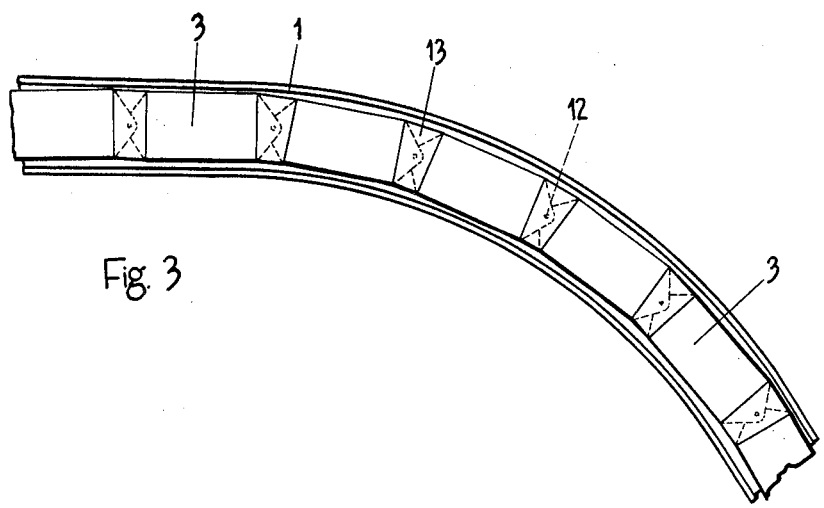
Figure 4:
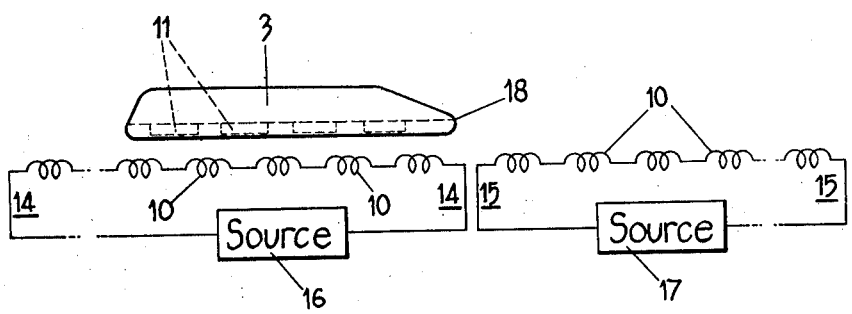
Figure 5:
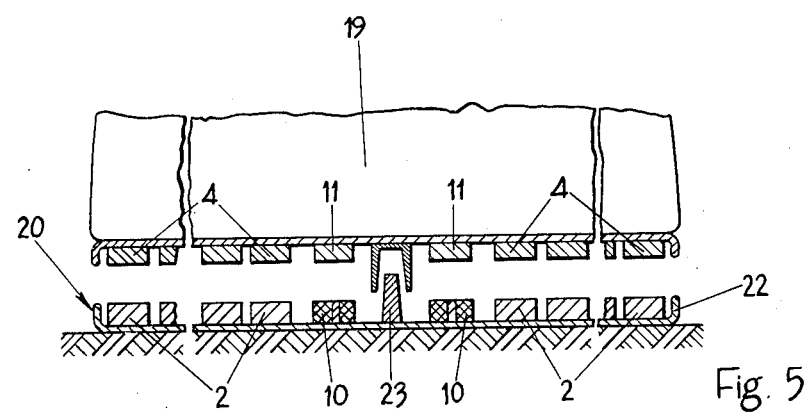
Figure 6:
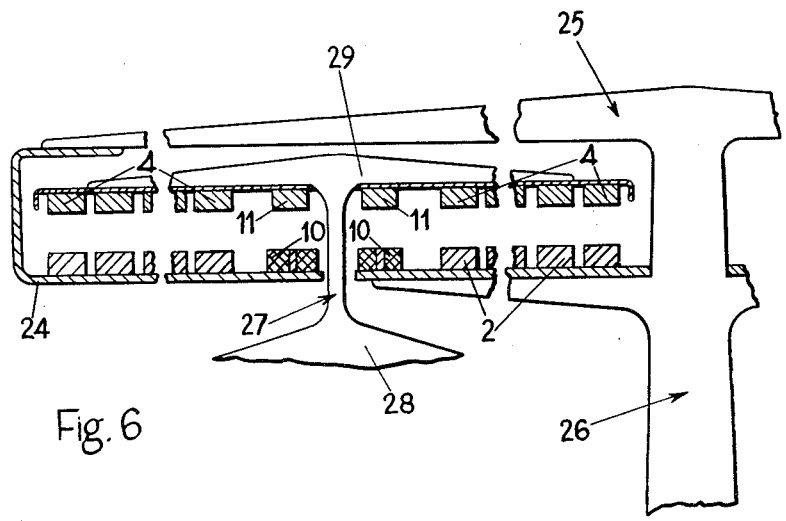

A system of transportation in accordance with the present invention together with two modifications of the system will now be described by way of example with reference to the accompanying drawings in which:

FIGURE 1 shows a plan view of a part of the system,
FIGURE 2 shows a cross-section on the line II—II of FIGURE 1,
FIGURE 3 shows a simplified plan view of a part of a particular arrangement of the system of FIGURES 1 and 2,
FIGURE 4 shows a simplified diagrammatic view of a part of another particular arrangement of the system of FIGURES 1 and 2,
FIGURE 5 shows a simplified cross-section of a part of the first modification to the system of FIGURES 1 and 2, and
FIGURE 6 shows a simplified cross-section of a part of the second modification to the system of FIGURES 1 and 2.

Referring now to FIGURES 1 and 2 of the drawings for a brief description of the system, it comprises a trackway 1 in which are disposed a number of permanent magnets 2 formed of barium ferrite. Co-operating with the trackway 1 are a number of vehicles, such as the vehicle 3, each of which is provided on its underside with an arrangement of permanent magnets 4, the magnets 4 also being formed of barium ferrite. The vehicle 3 is levitated, by the mutual repulsion between adjacents magnets 4 on the vehicle 3 and magnets 2 in the trackway 1, so that there is a gap of the order of one inch between the opposing surfaces of the magnets 2 and 4 when the vehicle 3 is not loaded. As the vehicle 3 is out of contact with the trackway 1 it is free of frictional forces and a comparatively small horizontal force applied to the vehicle 3 is sufficient to propel it forward.

Describing the system in more detail and considering the trackway 1 first, this includes a horizontal base 5 which may be formed of concrete or the like and which has a width slightly greater than the width of the vehicle 3. Resting on the base 5 is a shallow rectangular trough 6 of generally U cross-section, formed of mild steel. The open side of the trough 6 is uppermost and the width of the trough 6 between its side walls is slightly greater than that of the vehicle 3. Disposed on each side of the centre line of the trough 6 are a number of rows of magnets 2 which are in the form of rectangular blocks of barium ferrite 2½ inches by 1 inch by ½ inch. The magnets 2 are laid in the trough 6 with their longest dimension parallel to the length of the trackway 1 and with their shortest dimension vertical.

The magnets 2 are so energized that their magnetic poles are adjacent the two larger surfaces of each of the magnets 2, that is to say, are adjacent the upper and lower surfaces. All the magnets 2 in a row are arranged to have similar poles uppermost and the two rows 7 adjacent the centre of the trough 6 are arranged to have similar poles uppermost. An even number of rows of magnets 2 are provided on each side of the centre line of the trough 6 and, reading from the rows 7 outwards, the polarity of the magnets 2 in adjacent rows alternate.

Except in special circumstances, which will be mentioned later, adjacent magnets 2 in any given row are arranged to have their ends touching, although magnets in adjacent rows are spaced slightly apart.

The blocks of barium ferrite forming the magnets 2 may be magnetised either before laying or by a direct current pulse from capacitor discharge equipment after being placed in position in the trough 6. Once energized the magnets 2 adhere strongly to the mild steel forming the trough 6 and additional means of securing the magnets 2 in position may be dispensed with.

Leaving further consideration of the trackway 1 for the present and considering now the vehicle 3, this comprises, in its essentials, a mild steel base 8 having a number of magnets 4 attached (or merely adhering by attraction) to its underside, the magnets 4 being similar to the magnets 2. The cross-section of the base 8 is similar to that of the trough 6 although both the width and the depth of the base 8 are slightly less than the corresponding dimensions of the trough 6, and the base 8 is inverted with respect to the trough 6.

The arrangement of the magnets 4 on the underside of the base 8 is generally similar to the arrangement of the magnets 2 in the trough 6, the polarity of the rows of magnets 4 being such that when the vehicle 3 is positioned over the trackway 1 the magnets 2 and 4 have poles of similar polarity adjacent. With this arrangement there is a mutual repulsion between the magnets 2 and the magnets 4, this repulsion being arranged to be sufficient to levitate the vehicle 3 until the opposing rows of magnets 2 and 4 have a gap of the order of one inch between them. The mild steel forming the trough 6 and the base 8, in addition to supporting the magnets 2 and 4, has the effect of concentrating the magnetic flux between the opposing rows of magnets 2 and 4 and so increasing the repulsion between them.

Any increase in the weight of the vehicle 3 due, for example, to a passenger boarding the vehicle 3, tends to depress the vehicle 3 and decrease the gap between the rows of magnets 2 and 4. This in turn will increase the mutual repulsion between the opposing rows of magnets 2 and 4 so tending to restore the equilibrium of the vehicle 3. In a similar way, any decrease in the weight of the vehicle 3 will result in an increase in the gap between the opposing lines of magnets 2 and 4, so that the equilibrium is again restored.

The rows of magnets 2 in the trackway 1 are continuous but it is not essential that the rows of magnets 4 be continuous, so long as a sufficient number are provided to ensure that the vehicle 3 is at all times out of contact with the trackway 1.

In an experimental model it was found that the weight of the magnets 4 required to obtain a gap of the order of one inch between the magnets 4 and the magnets 2 was equal to rather less than one third of the total weight of the vehicle 3. The useful weight carried should not therefore, be less than half the weight of the vehicle 3 in the case of a passenger-carrying vehicle and may be rather more for a freight-carrying vehicle.

Lateral stability of the vehicles 3 is obtained by providing four adjusting and spacing bolts 9 of brass or other non-magnetic material screwed horizontally into the two edges of each vehicle 3 to make intermittent contact with the inner vertical sides of the trough 6. The bolts 9 are adjusted and locked in the magnetic balance position of the vehicle 3 over the centre of the trough 6 so that there is a small clearance of up to ⅛ inch to allow for slight imperfections in the dimension of the trough 6. To minimise the friction between the bolts 9 and the trough 6 the bolts 9 may be fitted with inserts of polytetrafluorethylene or similar low friction material. The bolts 9 are best located about one-quarter of the length of the vehicle 3 from each end to enable the vehicle 3 to travel around curves in the trackway 1.

The arrangement used for propelling the vehicle 3 comprises a row of coils 10 situated along the centre line of the trough 6 and a row of traction magnets 11, which may be similar to the magnets 2 and 4 previously described, attached to the underside of the base 8 along the centre line of the vehicle 3, so as to lie parallel to and vertically above the coils 10 when the vehicle 3 is situated on the trackway 1. The coils 10 are wound of anodised aluminium strip around an assembled core of steel laminations, the width of the strip being vertical, and the coils 10 being so connected that at any instant when a current is flowing through the coils 10 the upper surfaces of the adjacent coils 10 are, in effect, of opposite magnetic polarity. Similarly, the under surfaces of adjacent traction magnets 11 have opposite magnetic polarity and the distance between the centres of adjacent traction magnets 11 is the same as the distance between the centres of adjacent coils 10.

This arrangement works in the manner of a linear electric motor, so that when alternating current of comparatively low frequency is passed through the coils 10 in series, so that the coils 10 are energized with continually changing polarity the magnetic fields associated with the coils 10 co-operate by attraction and repulsion with the traction magnets 11 immediately above them, so that the vehicle 3 is propelled along the trackway 1 at a linear speed which is equal to the frequency of the alternating current supplied to the coils 10 multiplied by twice the distance between the centres of adjacent coils 10.

Alternating current of the required frequency may be provided by a special alternator driven by a direct current motor, or by a rotating commutator from a direct current supply. The current supplied to the coils 10 must be of sufficient value to provide a magneto-motive force similar to that of the traction magnets 11, that is to say, in the region of a thousand oersteds.

In an alternative arrangement the coils 10 may be attached to the vehicle 3 and the traction magnets 11 may be situated in the trackway 1. This may be of advantage in reducing the power consumption where the vehicles, such as the vehicle 3, are travelling intermittently along the trackway 1 but against this must be set the disadvantage that it necessitates the provision of moving contacts and conductor rails whereby the comparatively heavy alternating current required may be supplied to the coils 10 on the vehicle 3. On the other hand, the power consumption in the case where the coils 10 are situated in the trackway 1 may be reduced by providing intermittent switching of current in comparatively short sections of the trackway 1 in the case when vehicles 3 are passing at comparatively long intervals.

If it is required to reverse the direction of travel of the vehicle 3 it is necessary to use a three-phase alternating current supply and to connect the coils 10 in groups of three. In addition, this arrangement facilitates starting of the vehicle 3.

The arrangement of magnets 2 and coils 10 in the trackway 1 may be protected by providing a thin aluminium cover which, for the sake of simplification, is not shown in the drawings, which encloses the magnets 2 and the coils 10. A similar cover may be provided on the vehicle 3 to enclose the magnets 4 and the traction magnets 10. The presence of these covers formed of thin aluminium does not affect the mutual repulsion between the magnets 2 and 4 or the interaction between the coils 10 and the traction magnets 11. Such covers also assist in damping unwanted vertical movement and vibration of the vehicle 3, this effect being enhanced by increasing thickness of the sheet covering the trackway 1.

There are two main groups of applications for transport systems using the levitation principle described above; namely, slow speed conveyor systems and comparatively high speed "railway" systems.

FIGURE 3 of the drawings shows a simplified plan view of a part of a conveyor system in which parts similar to parts shown in FIGURES 1 and 2 are denoted by similar references. This comprises a number of vehicles 3 which co-operate with a trackway 1 which may conveniently be sunk into the ground or a floor so that the upper surface of the vehicles 3 is at ground level. The dimensions of the vehicles 3 are appropriate to the sharpest curve in the conveyor system and the ends of each vehicle 3 are connected by means of some flexible linkage, such as a pin 12 which passes through overlapping portions of adjacent vehicles 3, which allows the required relative movement of adjacent vehicles 3 to enable the system to negotiate curves. The joints between the vehicles 3 may be provided with a flexible overlapping cover 13 so that the conveyor presents an uninterrupted upper surface.

The general arrangement for supporting the vehicles 3 and for propelling them along the trackway 1 is similar to that described with reference to FIGURES 1 and 2 of the drawings and is therefore not shown in FIGURE 3. The vehicles 3 are arranged to move continuously at a constant speed under the action of an alternating current supplied to the propulsion coils corresponding to the coils 10 of FIGURES 1 and 2 of the drawings and the system may therefore readily be controlled from a central point. It will be appreciated that there are no exposed electrical surfaces of contacts and the external magnetic fields are minimised by the presence of the mild steel used in the construction of the vehicles 3 and the trackway 1. Magnetic flux leakage will, in fact, be very low provided the mild steel is thick enough to carry all the flux between adjacent rows of magnets without saturating.

Where it is essential to avoid mechanical contact lateral stabilization of the vehicles 3 may be assisted by providing further rows of permanent magnets (not shown) on the vehicle 3 and in the trackway 1, these further rows of magnets co-operating to exert equal and opposite horizontal forces on the vehicle in directions normal to the direction of motion.

Referring now to FIGURE 4 of the drawings, this shows in diagrammatic form a length of "railway" using the principles described above with reference to FIGURES 1 and 2, similar reference numerals again being used to denote similar parts. The vehicles 3 co-operating with the trackway 1 will, in this case, operate singly and it will in addition be necessary to provide means for varying the speed of the vehicles 3. This may be done by dividing the trackway 1 into a number of sections such as the sections 14 and 15, adjacent sections being supplied with alternating current from sources 16 and 17 operating at different frequencies. In its most convenient form the system will be arranged so that the vehicles 3 are moving continuously, at low speed in stations and at high speed between stations.

If then the section 14 is taken to be a section at a station, the frequency of current supplied by the source 16 to the propulsion coils 10 in the trackway 1 in the section 14 may be such that the vehicle 3 shown on the section 14 is moving forward at a speed of one foot per second, so that passengers can board or leave the vehicle 3, through automatically controlled doors, without difficulty.

In the next adjacent section 15 the current supplied by the source 17 to the propulsion coils 10 in the trackway 1 has a higher frequency than the current supplied by the source 16, so that as the vehicle 3 passes into the section 15 its speed will be increased. From the section 15 the vehicle 3 passes into further sections (not shown) to which are supplied alternating current of progressively greater frequency until the vehicle 3 reaches the maximum required speed. As the vehicle 3 approaches the next station it will enter a series of sections in which its speed is progressively reduced to the required low speed at which it passes through stations.

Such an arrangement admits of central control of the vehicles 3 without the necessity for individual drivers or any form of signalling. A convenient method of operating the system is to arrange for the vehicles 3 to operate with a fixed time interval between them. If then this time interval is taken to be 2 minutes, then this corresponds, in the section 14 of the trackway where the vehicles 3 are moving at one foot per second, to a spacing between centres of adjacent vehicles 3 of 120 feet. As the vehicles 3 move in to sections where they operate at higher speeds this spacing will increase until, on a section where the vehicles 3 are moving at 250 feet per second say, the spacing between vehicles 3 will have increased to approximately six miles. It will be appreciated that in any given section all the vehicles 3 in that section will always be travelling at the same speed and consequently the possibility of collision between vehicles is removed.

The construction of the bodies of the vehicles 3 is as light as possible, whilst being consistent with the requirements of the high speeds at which the vehicles 3 are capable of travelling. The construction is conveniently similar to that normally used for ircraft fuselages, making use of light metals and having a streamlined outer surface 18 to reduce wind resistance and wind noise at high speeds.

Reference is now made to FIGURES 1 and 2 also; although, as previously mentioned, the rows of magnets 2 in the trackway 1 are normally continuous there are two occasions where it may be desirable for the spacing between adjacent magnets 2 in the rows to be increased. The first of these occurs where the trackway 1 is to be curved, and there is consequently a tendency for vehicles 3 travelling on the trackway 1 at speed to tilt due to centrifugal force. This tendency is largely overcome by the consequent increase in the repulsion between the magnets 2 and 4 on the ouside of the curve as the vehicle 3 tilts and the corresponding decrease in the repulsion between adjacent mangets 2 and 4 on the inside of the curve. This effect may be enhanced by increasing the spacing of the mangets 2 on the inside of curved parts of the trackway 1, thereby reducing the upward force on the inside of the vehicles 3 at these points.

The spacing between the mangets 2 in the trackway 1 may also be varied for the purpose of creating an artificial gradient, thus it will be appreciated that if the number of magnets 2 in the trackway is reduced the vehicle 3 will tend to ride downwards so that the gap between the magnets 2 and 4 decreases. A generally similar effect may be achieved by reducing the thickness of the magnets 2. On level sections of the trackway 1, therefore, this has the effect of a down gradient and conversely an up graident can be simulated in the reverse manner.

This effect may be used for giving an increased acceleration or deceleration to the vehicles 3 and may, in particular, be used to provide a smoother change in speed as a vehicle 3 passes from one section, such as the section 14, to the adjacent section such as the section 15, where its speed is to be different. Thus as a vehicle 3 approaches a section where its speed is to be higher an artificial down gradient may be provided at the end of the section which the vehicle 3 is leaving so that the vehicle 3 passes in to the section it is entering at a speed which is higher than the normal speed for the section at which it is leaving. Conversely, the transition from a high speed section to a lower speed section may be made more smooth by providing an artificial up gradient at the end of the high speed section.

The two modifications to the system which are to be described both relate to the "railway" type of system, the first modification providing an arrangement of the mono-rail principle and the second modification providing an arrangement suitable for overhead operation. As before similar reference numerals are used to indicate parts similar to those described with reference to FIGURES 1 and 2.

The first modification is illustrated in FIGURE 5 of the drawings, which shows a cross-section through a vehicle 19 and a part of the trackway 20. Considering the trackway 20 first, this is generally similar to the trackway 1 shown in FIGURES 1 and 2 of the drawings, and comprises a base 21 and magnets 2 laid on backing plates 22 of mild steel. Extending longitudinally of the centre of the trackway 20 is a continuous part 23 which is raised with respect to the remainder of the trackway 20, the vehicle 19 being arranged to straddle the part 23.

The vehicle 19 is provided on its lower under surface with magnets 4 which co-operate by repulsion with the magnets 2 in the trackway 20 to give the required levitation to the vehicle 19. Lateral stabilization is arranged by adjusting bolts (not shown) on the vehicle 22 as before but bearing on the part 23. Propulsion is similar to that previously described with reference to FIGURES 1 and 2, by means of magnets 11 disposed under the centre of the vehicle 19 and coils 10 fixed symmetrically each side of part 23. In other respects, this arrangement is similar to the "railway" system previously described with reference to FIGURE 3.

Referring now to FIGURE 6 of the drawings, the overhead system comprises a box girder 24 of large, generally rectangular, cross-section which runs longitudinally of the trackway 25 and which is supported above ground level, for example, on concrete pillars 26. The sides of the girder 24 are horizontal and vertical and in the lower horizontal side there is a comparatively narrow gap 27 extending the length of the girder 24 parallel to its longitudinal axis. Disposed on each side of the gap 27 are a number of lines of magnets 2 corresponding in layout and function to the similarly referenced magnets shown in FIGURES 1 and 2 of the drawings.

Considering now a vehicle 28 which co-operates with the trackway 25, this is provided with a supporting structure 29 attached to its upper side, the supporting structure 29 being of generally T cross-section in a plane at right angles to the longitudinal axis of the girder 24 and of the vehicle 28. The stem of the T is arranged to project upwards through the gap 27 so that the bar of the T is within the girder 24. The underside of the bar of the T is provided with a number of lines of magnets 4 similar in layout and function to the similarly referenced magnets shown in FIGURES 1 and 2 of the drawings.

The mutual repulsion between the magnets 2 and 4 is such as to levitate the supporting structure 29 and consequently support the vehicle 28. Lateral stabilization is provided in the manner previously described.

Propulsion of the vehicles 28 is similar to that previously described for the first "railway" system, magnets 11 being provided on the underside of the bar of the T of the supporting structure 28 and the coils 10 being provided on the upper side of the lower horizontal wall of the girder 24. In other respects the overhead system is similar to the "railway" systems previously described.

It will be appreciated that the method of propulsion described is not the only one which may be used and a number of other arrangements may be used. For example, electric motors may be provided on the vehicles, these motors being arranged to drive wheels which are spring biased downwards so as to bear on a part of the trackway, for the purpose of driving the vehicles forward. With such an arrangement a part of the weight of the vehicles is carried by these driving wheels and losses due to friction are necessarily introduced. These losses may however be comparatively small, since the comparatively small force necessary to move the vehicles forward may be provided with quite light contact between the driving wheels and the trackway.

Although the use of barium ferrite magnets has been described it will be appreciated that any magnetic material having the required properties, which include high coercivity and good resistance to demagnetizing fields, may be used. One such possibility is the use of iron micro power which is magnetized and suitably orientated in a plastic medium. Another possibility is a material formed by non-cubic crystals of polyoxides of iron and at least one of the metals barium, strontium, lead and, if necessary, calcium. The ferromagnetic properties of such a material are mainly determined by single and/or mixed crystals of magnetoplumbite structure of composition $MO.6Fe_2O_3$, where M is one of the metals barium, strontium or lead.

I claim:

1. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, and wherein the trackway includes a substantially continuous, longitudinally-extending part which is raised with respect to the remainder of the trackway, the vehicle being provided with guidance means which are arranged to co-operate with said part.

2. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, and wherein the vehicle is suspended below the trackway by means of a supporting structure which forms part of the vehicle and which co-operates with the trackway to support the vehicle, said magnets on the vehicle being provided on the supporting structure.

3. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, and wherein a longitudinally-extending series of vehicles are provided, each vehicle being flexibly coupled at its ends to the adjacent vehicles on either side, the series of vehicles together having a substantially continuous upper surface whereby the system may be used as a conveyor.

4. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is not load bearing contact between the vehicle and the trackway, wherein said magnets in the trackway are arranged in rows which extend longitudinally of the trackway, all the magnets in any given row in the trackway having poles of the same polarity uppermost and, apart from the two rows of magnets in the trackway which are nearest the center of the trackway, all the magnets in any given row in the trackway being opposite polarity to the magnets in the immediately adjacent rows, and wherein said magnets on the vehicle are arranged in rows similar in number and disposition to the rows in the trackway, all the magnets in any given row on the vehicle having poles of the same polarity downwards, this polarity being the same as that of the magnets in the immediately adjacent row of magnets in the trackway.

5. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, and wherein said means to propel the vehicle comprises a row of coils disposed longitudinally of the trackway, a row of traction permanent magnets disposed longitudinally of the vehicle, the row of coils and the row of traction magnets being adjacent one another and the row of traction magnets being arranged to have poles of alternate polarity adjacent the coils, and means arranged to energize the coils with an alternating current so as to generate magnetic fields which give rise, in effect, to magnetic poles adjacent the traction magnets so that the magnetic fields associated with the coils co-operate by attraction and repulsion with the magnetic fields associated with the traction magnets in such a way that the vehicle is propelled along the trackway.

6. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, wherein said magnets in the trackway are arranged in rows which extend longitudinally of the trackway, all the magnets in any given row in the trackway having poles of the same polarity uppermost and, apart from the two rows of magnets in the trackway which are nearest the center of the trackway, all the magnets in any given row in the trackway being of opposite polarity to the magnets in the immediately adjacent rows, wherein said magnets on the vehicle are arranged in rows similar in number and disposition to the rows in the trackway, all the magnets in any given row on the vehicle having poles of the same polarity downwards, this polarity being the same as that of the magnets in the immediately adjacent row in the trackway, and wherein, on a curved part of the trackway, the spacing between adjacent magnets in those rows of magnets in the trackway which are on the inside of the curve is increased.

7. A system of transportation including at least one vehicle, a trackway with which said vehicle is arranged to cooperate, and means to propel the vehicle from place to place along the trackway, wherein permanent magnets each having a constant flux are provided in the trackway and on the vehicle, the mutual repulsion between the permanent magnets on the vehicle and adjacent permanent magnets in the trackway being solely the function of the loaded weight of the vehicle and such that there is no load bearing contact between the vehicle and the trackway, wherein said means to propel the vehicle comprises a row of coils disposed longitudinally of the trackway, a row of traction permanent magnets disposed longitudinally of the vehicle, the row of coils and the row of traction magnets being adjacent one another and the row of traction magnets being arranged to have poles of alternate polarity adjacent the coils, and means arranged to energize the coils with an alternating current so as to generate magnetic fields which give rise, in effect, to magnetic poles adjacent the traction magnets so that the magnetic fields associated with the coils cooperate by attraction and repulsion with the magnetic fields associated with the traction magnets in such a way that the vehicle is propelled along the trackway, and wherein the trackway is divided into sections and said current with which the coils are energized is of different frequency in adjacent sections so that the speed of the vehicle changes as it passes from one section to the next adjacent section.

8. A system according to claim 4 wherein backing plates formed of steel are provided below said rows of magnets in the trackway and above said rows of magnets on the vehicle.

9. A system according to claim 8 wherein said magnets are attached to the trackway solely by the attraction between the magnets and said backing plate in the trackway.

10. A system according to claim 5 wherein said row of traction magnets is centrally disposed on the vehicle.

11. A system according to claim 5 wherein said traction magnets are formed of barium ferrite.

12. A system according to claim 7 wherein said traction magnets are formed of barium ferrite.

References Cited in the file of this patent

UNITED STATES PATENTS

| | | |
|---|---|---|
| 782,312 | Zehden | Feb. 14, 1905 |
| 1,020,942 | Bachelet | Mar. 19, 1912 |
| 1,020,943 | Bachelet | Mar. 19, 1912 |
| 2,436,939 | Schog | Mar. 2, 1948 |
| 2,946,930 | Gilbert | July 26, 1960 |
| 2,993,130 | Laithwaite | July 18, 1961 |

OTHER REFERENCES

Article: Oriented Ceramic Permanent Magnet, Electronic Design, February 15, 1957, p. 38.